United States Patent
Kompella et al.

(10) Patent No.: US 11,716,737 B2
(45) Date of Patent: Aug. 1, 2023

(54) GRATUITOUS PUSCH GRANTS DURING LTE RRC CONNECTION AND NAS ATTACH PROCEDURES

(71) Applicant: CommScope Technologies LLC, Hickory, NC (US)

(72) Inventors: Purnima Venkata Kompella, Bangalore (IN); Gopinath Kommi, Bengaluru (IN); Shakar Saragadam, Bengaluru (IN); Nandish Chalishazar, Nashua, NH (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/405,830

(22) Filed: May 7, 2019

(65) Prior Publication Data
US 2019/0349982 A1 Nov. 14, 2019

Related U.S. Application Data

(60) Provisional application No. 62/668,738, filed on May 8, 2018.

(51) Int. Cl.
*H04W 72/1268* (2023.01)
*H04W 72/23* (2023.01)

(52) U.S. Cl.
CPC ....... *H04W 72/23* (2023.01); *H04W 72/1268* (2013.01)

(58) Field of Classification Search
None
See application file for complete search history.

(56) References Cited

U.S. PATENT DOCUMENTS 9,474,054 B1  10/2016  Pawar et al.
10,785,791 B1 * 9/2020  Eyuboglu ............. H04L 1/1887
(Continued)

FOREIGN PATENT DOCUMENTS

CN    102421192 A    4/2012
CN    104685955 A    6/2015
(Continued)

OTHER PUBLICATIONS

International Searching Authority, "International Search Report and Written Opinion from PCT Application No. PCT/US2019/031179 dated Aug. 23, 2019", from Foreign Counterpart to U.S. Appl. No. 16/405,801, pp. 1-11, Published: WO.
(Continued)

*Primary Examiner* — Nicholas Sloms
(74) *Attorney, Agent, or Firm* — Fogg & Powers LLC

(57) ABSTRACT

One embodiment is directed to sending a request message from the base station to the UE on a downlink channel and making, by the base station, a gratuitous grant, to the UE, of resources on the uplink channel for the UE to transmit a response message on the uplink channel. The response message is responsive to the request message. The gratuitous grant is made without waiting for a request from the UE for a grant of resources on the uplink channel for the UE to transmit the response message on the uplink channel. The base station receives the response message transmitted by the UE on the uplink channel in response to the gratuitous grant. Other embodiments are disclosed.

26 Claims, 7 Drawing Sheets

(56) References Cited

U.S. PATENT DOCUMENTS

Figure 1:
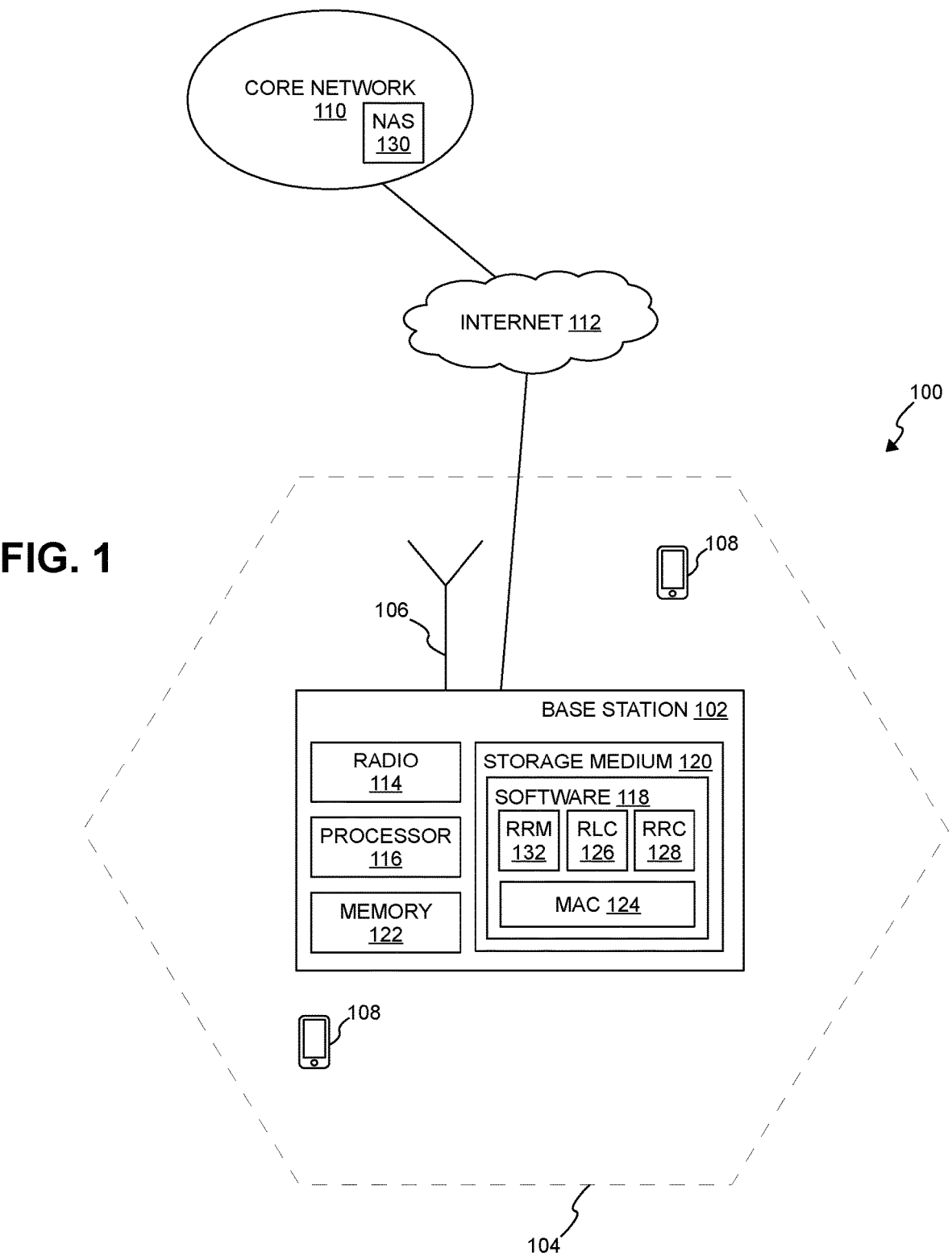

| | | | |
|---|---|---|---|
| 2004/0174838 A1* | 9/2004 | Sillasto | H04W 28/06 370/328 |
| 2006/0094367 A1 | 5/2006 | Miyoshi et al. | |
| 2007/0140165 A1* | 6/2007 | Kim | H04W 72/1268 370/329 |
| 2011/0009116 A1* | 1/2011 | Moberg | H04W 24/10 455/425 |
| 2011/0292901 A1* | 12/2011 | Pettersson | H04L 47/28 370/329 |
| 2012/0327799 A1* | 12/2012 | Sandlund | H04W 72/1221 370/252 |
| 2013/0028220 A1* | 1/2013 | Andreozzi | H04L 47/14 370/329 |
| 2013/0034014 A1 | 2/2013 | Jonsson et al. | |
| 2013/0065562 A1* | 3/2013 | Singh | G06F 3/04842 455/414.1 |
| 2013/0170461 A1 | 7/2013 | Ren | |
| 2013/0225218 A1 | 8/2013 | Arthur et al. | |
| 2015/0223184 A1* | 8/2015 | Bergstrom | H04W 72/0446 370/329 |
| 2015/0245326 A1* | 8/2015 | Rune | H04L 5/006 370/329 |
| 2016/0066276 A1* | 3/2016 | Su | H04W 52/0261 370/252 |
| 2016/0278113 A1* | 9/2016 | Sandberg | H04W 28/0278 |
| 2016/0330761 A1* | 11/2016 | Svedman | H04W 72/0426 |
| 2016/0366704 A1 | 12/2016 | Lee et al. | |
| 2017/0019914 A1 | 1/2017 | Rune et al. | |
| 2017/0105231 A1 | 4/2017 | Jersenius et al. | |
| 2017/0208615 A1 | 7/2017 | Zhang et al. | |
| 2017/0303273 A1* | 10/2017 | Jin | H04W 72/1263 |
| 2018/0019854 A1* | 1/2018 | Andreoli-Fang | H04W 72/0406 |
| 2018/0084542 A1 | 3/2018 | Fujishiro et al. | |
| 2018/0115988 A1 | 4/2018 | Lee et al. | |
| 2019/0124571 A1* | 4/2019 | Kong | H04W 72/1284 |
| 2019/0230691 A1* | 7/2019 | Cao | H04W 72/1268 |
| 2019/0246378 A1* | 8/2019 | Islam | H04W 72/042 |
| 2019/0349981 A1 | 11/2019 | Sandberg et al. | |
| 2020/0059935 A1* | 2/2020 | Qian | H04W 74/02 |
| 2020/0145125 A1 | 5/2020 | Wang et al. | |

FOREIGN PATENT DOCUMENTS

| | | |
|---|---|---|
| CN | 104811283 A | 7/2015 |
| EP | 2557882 A1 | 2/2013 |
| KR | 20170089097 A | 8/2017 |
| WO | 2011044494 A1 | 4/2011 |
| WO | 2018077425 A1 | 5/2018 |

OTHER PUBLICATIONS

International Searching Authority, "International Search Report and Written Opinion from PCT Application No. PCT/US2019/031187 dated Aug. 23, 2019", from Foreign Counterpart to U.S. Appl. No. 16/405,830 , pp. 1-11, Published: WO.

U.S. Patent and Trademark Office, "Notice of Allowance", U.S. Appl. No. 16/405,801, dated Jan. 25, 2021, pp. 1 through 25, Published: US.

U.S. Patent and Trademark Office, "Notice of Allowance", U.S. Appl. No. 16/405,801, dated May 5, 2021, pp. 1 through 9, Published: US.

European Patent Office, "Extended European Search Report from EP Application No. 19799949.3", dated Jan. 31, 2022, from Foreign Counterpart to U.S. Appl. No. 16/405,851, pp. 1 through 9, Published: EP.

European Patent Office, "Extended European Search Report from EP Application No. 19800230.5", from Foreign Counterpart to U.S. Appl. No. 16/405,830, dated Jan. 7, 2022, pp. 1 through 9, Published: EP.

China National Intellectual Property Administration "Notification of the First Office Action", from CN Application No. 201980028896. 5, dated Apr. 22, 2023, from Foreign Counterpart to U.S. Appl. No. 16/405,830, pp. 1 through 15, Published: CN.

China National Intellectual Property Administration, "Notification of the First Office Action", from CN Application No. 201980026932. 4, dated May 9, 2023, from Foreign Counterpart to U.S. Appl. No. 16/405,801, pp. 1 through 13, Published: CN.

Intel Corporation, "Uplink URLLC Transmission Based on Scheduling Request and Grant", R1-1700376, 3GPP TSG RAN WG1 NR Ad-Hoc Meeting, Spokane, USA, Jan. 16-20, 2017, pp. 1 through 8.

NTT DoCoMo et al., "Multiplexing Method of Downlink L1/L2 Control Channel with Shared Data Channel in E-UTRA Downlink", 3GPP TSG RAN WG1 Meeting #47, R1-063323, Riga, Latvia, Nov. 6-10, 2006, pp. 1 through 12.

* cited by examiner

GRATUITOUS PUSCH GRANTS DURING LTE RRC CONNECTION AND NAS ATTACH PROCEDURES

CROSS-REFERENCE TO RELATED APPLICATION

This application claims the benefit of U.S. Provisional Patent Application Ser. No. 62/668,738, filed on May 8, 2018, and titled "GRATUITOUS PUSCH GRANTS DURING LTE RRC CONNECTION AND NAS ATTACH PROCEDURES", which is hereby incorporated herein by reference.

BACKGROUND

In Long Term Evolution (LTE) wireless systems, the Physical Uplink Shared Channel (PUSCH) is defined as a shared channel for use by user equipment (UE). Typically, a UE requests an uplink transmission opportunity on the PUSCH by sending a scheduling request (SR) to the serving base station (also referred to as an "Evolved Node B" or "eNodeB") on the Physical Uplink Control Channel (PUCCH).

In response to the SR, if appropriate, the serving eNodeB will grant the UE PUSCH resources for transmitting on the PUSCH. Typically, each SR informs the eNodeB that the UE needs access to the PUSCH but does not indicate how much data the UE has to transmit on the PUSCH. As a result, the eNodeB will grant the UE a nominal amount of PUSCH resources by sending the UE a DCI0 message on the PDCCH.

This nominal PUSCH grant includes sufficient PUSCH resources for the UE to send a Buffer Status Report (BSR) and a Power Headroom Report (PHR) on the PUSCH but may not be sufficient to send all of the uplink data buffered at the UE. The BSR indicates how much uplink data the UE has buffered for transmission on the PUSCH. In response to receiving the BSR from the UE, the eNodeB makes one or more subsequent PUSCH grants to the UE (signaled using DCI0 messages) for transmitting the buffered uplink data on the PUSCH. The BSR value is used by the eNodeB to track the amount of buffered data that remains at the UE. For each PUSCH grant, after the eNodeB successfully receives uplink data from the UE on the PUSCH, the tracked BSR value is reduced by the amount of data successfully received. The eNodeB stops making PUSCH grants to the UE once the tracked BSR value reaches zero.

The eNodeB typically assigns the connected UEs periodic PUCCH resources during which the UEs can make SRs. These resources are referred to as "SR occasions" for the UE. When uplink data is ready at the UE for uplink transmission and the UE does not already have a PUSCH grant, the UE will send an SR at its next SR occasion. If the serving eNB responds with a PUSCH grant, then the UE will utilize the PUSCH grant to send the uplink data. If the serving eNB does not respond to the SR with a PUSCH grant, then the UE will send another SR at its next SR occasion. The UE repeatedly sends SRs until it receives a PUSCH grant or it has made a configurable maximum number of SRs. This configuration parameter is referred to as "dSRTransMax." Once dSRTransMax is reached by the UE, the UE must use the Random Access Channel (RACH) procedure to get a PUSCH grant. Also, UEs that are not assigned periodic PUCCH resources for making SRs must use the RACH procedure to obtain a PUSCH grant.

For those UEs assigned SR occasions, the UE will have to hold (enqueue) uplink packets for a relatively long time if the period between successive SR occasions assigned to that UE is large. Also, the UE will have to hold uplink packets for a relatively long time if the RACH procedure must be used by the UE to make an SR.

Moreover, there may be heavy demand from different UEs for access to the PUSCH and, a result, it may take some time for the serving eNodeB to assign PUSCH to all of the UEs. Furthermore, transmissions on the PUSCH may undergo hybrid automatic repeat request (HARQ) retransmissions. All of these situations add to the latency between when a packet becomes ready for transmission on the PUSCH from the UE and when it is successfully received by the serving eNodeB.

LTE data traffic tends to be bursty in nature. Each data-burst usually lasts for a few seconds (for example, 10-15 seconds) followed by relatively long inactivity period (on the order of several tens of seconds). The serving eNodeB typically runs an inactivity timer for every connected UE. If there is no uplink or downlink traffic for the amount of time tracked by the inactivity timer, the UE's Radio Resource Control (RRC) connection is released.

Typically, there is a maximum number of UEs that can have active RRC connections with the serving eNodeB. Releasing RRC connections that have been inactive for a period of time enables the RRC connections to be used by UEs that are ready to actively use an RRC connection instead of being idle.

When there is data to be transmitted to or from a UE that does not have an RRC connection with the serving eNodeB, an RRC connection, Non-Access Stratum (NAS) context, and NAS default bearer must be established for the UE using the LTE RRC connection and NAS attach procedures, which involve the UE, serving eNodeB, and Evolved Packet Core (EPC) exchanging signaling messages on the LTE Signal Radio Bearers (SRBs). These procedures are also referred to here as the "Connection and Attach procedures." These exchanges may take 100-200 milliseconds to complete before any real user traffic can flow. Additional time is required if the UE has to do these procedures after a power cycle rather an Idle-to-Active transition.

Uplink latency has a pronounced impact during the Connection and Attach procedures because each such procedure involves a downlink message that is usually a request that the UE acts on and responds to with a corresponding message. Also, the UE must respond to the request within a predetermined amount of time. If the UE does not, the current process of performing the Connection and Attach procedures is terminated and the UE must restart the process of performing the Connection and Attach procedures.

A UE can include a BSR along with any messages it transmits on the PUSCH during the Connection and Attach procedures. However, such a BSR can only be sent for those uplink messages that are ready to be transmitted. The Connection and Attach procedures are generally serial in nature and, therefore, successive uplink messages will not be ready until after the current uplink messages have been transmitted. As a result, it is likely that a UE will need to make a SR for each message to be sent by the UE on the PUSCH during the Connection and Attach procedures.

As noted above, the initial PUSCH grant resulting from a SR is typically small. It is sufficient for the UE to send a BSR and PHR but may not be sufficient to send all of the uplink data buffered at the UE. The RRC and NAS uplink messages sent during the Connection and Attach procedures may undergo Radio Link Control (RLC) segmentation, which can result in RLC Acknowledge Mode (AM) timers expiring and requiring message retransmission.

The serving eNodeB typically has a configurable maximum number of UEs that can be scheduled to use the PUSCH during any given tick. This limitation is typically determined based on the processing resources in the eNodeB. As noted above, each SR results in a small nominal PUSCH grant; however, each such nominal PUSCH grant, regardless of its small size, requires another UE to be scheduled during the current tick, which counts against the maximum number of UEs that can be scheduled during the current tick. This can result in PUSCH resources being underutilized.

Also, SRs are communicated without cyclic redundancy check (CRC) protection and, instead, are communicated solely using power detection. If a SR is detected when one was not actually transmitted by a UE, a harmless extra PUSCH grant may result; however, if a SR that was actually transmitted by a UE is not detected, uplink latency will result that may in turn lead to expiration of higher-layer timers.

Moreover, to keep uplink latency low during the Connection and Attach procedures (and hence improve the user experience), the serving eNodeB typically assigns frequent SR occasions to the UE so that the UE will be able to transmit a SR shortly after a such a response is ready at the UE. Assigning frequent SR occasions to the UE during Connection and Attach procedures (so that it can send a SR as soon as each reply message is ready) may not help to improve the user experience since most of these procedures are driven by EPC. As a result, many of the SR occasions assigned to the UE will not be used by the UE and therefore will be "wasted" when the UE must wait for the EPC to start the next procedure following the completion of the current one.

SUMMARY

One embodiment is directed to a method performed by a base station in connection with communicating with user equipment (UE). The method comprises sending a request message from the base station to the UE on a downlink channel. The method further comprises, making, by the base station, a gratuitous grant, to the UE, of resources on the uplink channel for the UE to transmit a response message on the uplink channel. The response message is responsive to the request message. The gratuitous grant is made without waiting for a request from the UE for a grant of resources on the uplink channel for the UE to transmit the response message on the uplink channel. The method further comprises, receiving, by the base station, the response message transmitted by the UE on the uplink channel in response to the gratuitous grant.

Another embodiment is directed to a base station configured to wirelessly communicate with user equipment (UE). The base station comprises a radio configured to wirelessly communicate with an item of user equipment (UE) and at least one processor. The at least one processor is configured to cause the base station to send a request message from the base station to the UE on a downlink channel. The at least one processor is further configured to cause the base station to make, by the base station, a gratuitous grant, to the UE, of resources on the uplink channel for the UE to transmit a response message on the uplink channel. The response message is responsive to the request message. The gratuitous grant is made without waiting for a request from the UE for a grant of resources on the uplink channel for the UE to transmit the response message on the uplink channel. The at least one processor is further configured to cause the base station to receive, by the base station, the response message transmitted by the UE on the uplink channel in response to the gratuitous grant.

Another embodiment is directed to a method performed by a base station in connection with communicating with user equipment (UE). The method comprises determining that a UE requires periodic grants of resources on the uplink channel. The method further comprises making, by the base station, periodic gratuitous grants, to the UE, of resources on the uplink channel for the UE if needed. Each gratuitous grant is made without waiting for a request from the UE for a grant of resources on the uplink channel for the UE. The method further comprises receiving, by the base station, uplink messages transmitted by the UE on the uplink channel.

Another embodiment is directed to a base station configured to wirelessly communicate with user equipment (UE). The base station comprises a radio configured to wirelessly communicate with an item of user equipment (UE) and at least one processor. The at least one processor is configured to cause the base station to determine that a UE requires periodic grants of resources on the uplink channel. The at least one processor is configured to cause the base station to make, by the base station, periodic gratuitous grants, to the UE, of resources on the uplink channel for the UE if needed. Each gratuitous grant is made without waiting for a request from the UE for a grant of resources on the uplink channel for the UE. The at least one processor is further configured to cause the base station to receive, by the base station, uplink messages transmitted by the UE on the uplink channel.

DRAWINGS

FIG. 1 is a block diagram illustrating one exemplary embodiment of a radio access network (RAN) system in which the techniques described here can be implemented.

Figure 2:
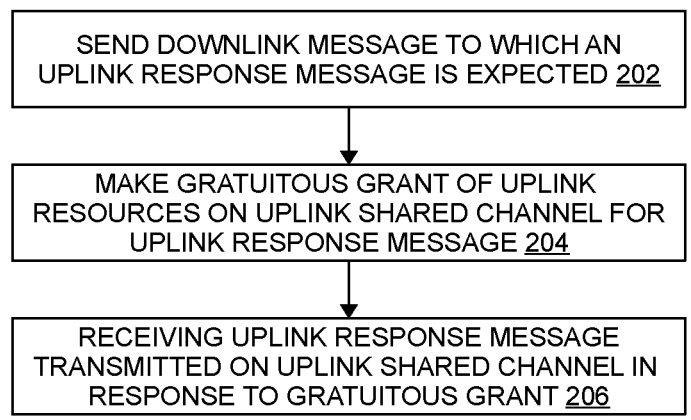

FIG. 2 comprises a high-level flow chart illustrating one exemplary embodiment of a method of making gratuitous grants of uplink shared channel resources.

Figure 3:
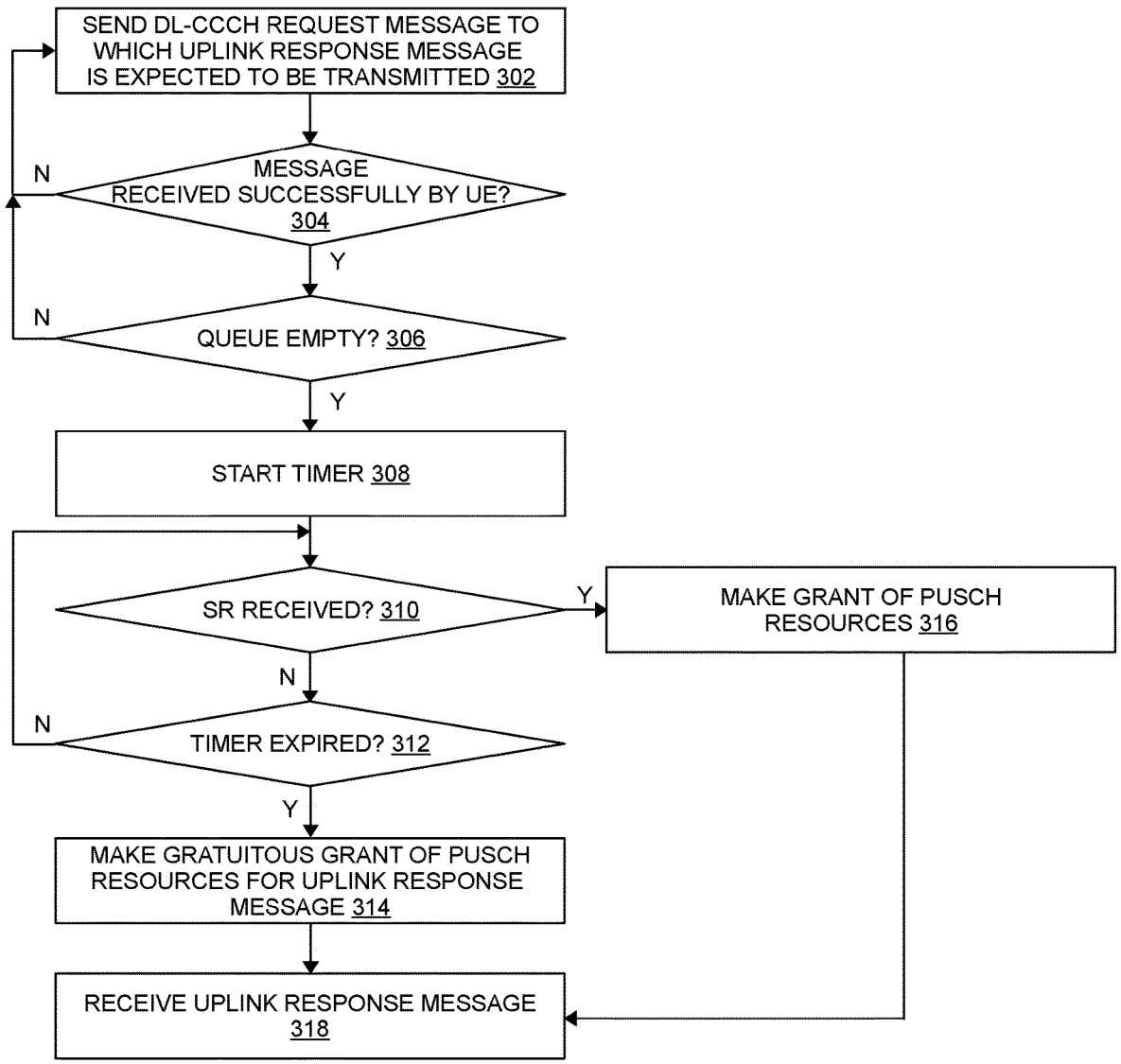

FIG. 3 comprises a flow chart illustrating one exemplary embodiment of a method of making a gratuitous grant of PUSCH resources in connection with a Downlink Common Control Channel (DL-CCCH) message transmitted in connection with the LTE Connection and Attach procedures.

Figure 4:
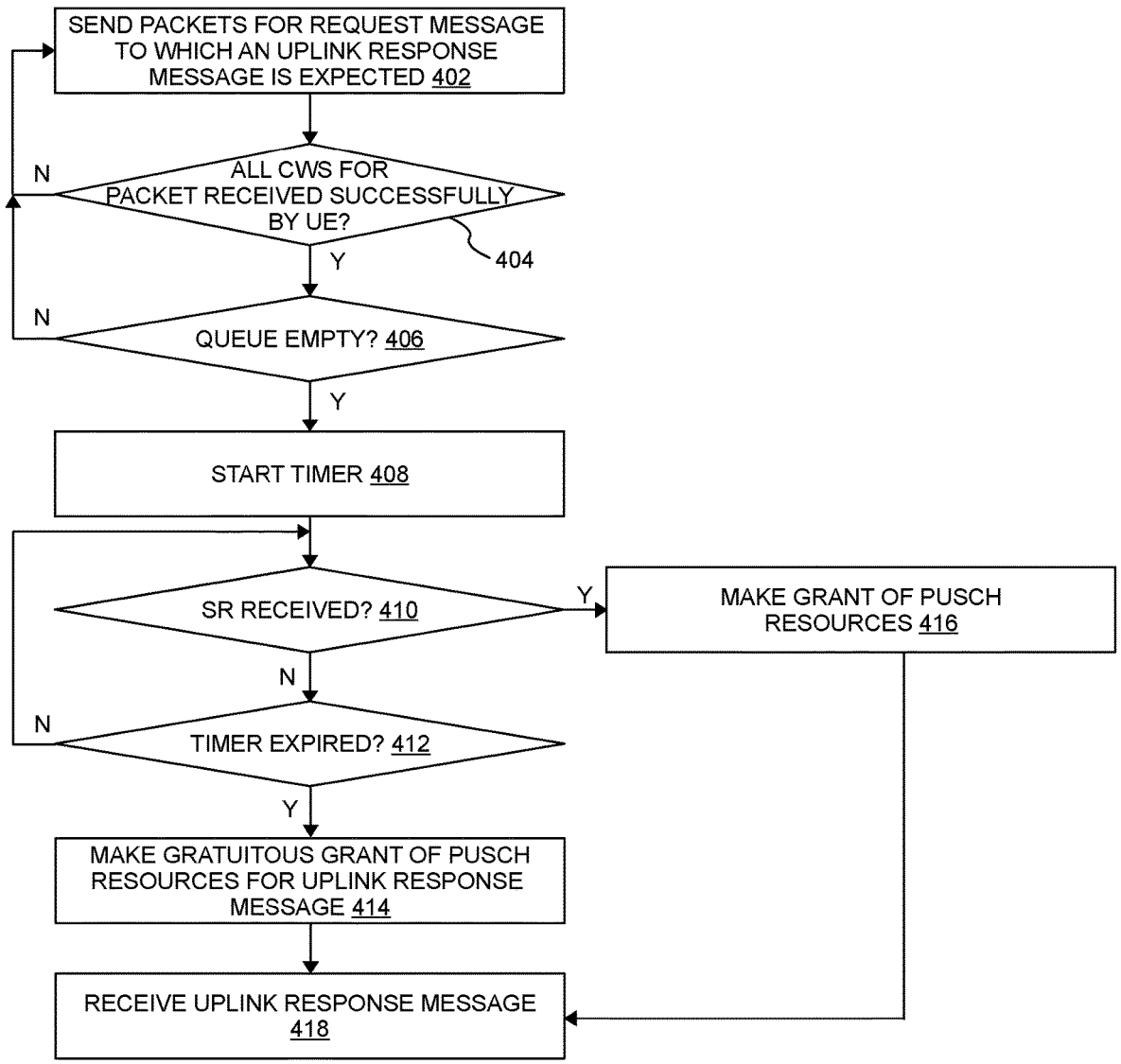

FIG. 4 comprises a flow chart illustrating one exemplary embodiment of a method of making a gratuitous grant of PUSCH resources in connection with an exchange of SRB1 or SRB2 messages during the LTE Connection and Attach procedures.

Figure 5:
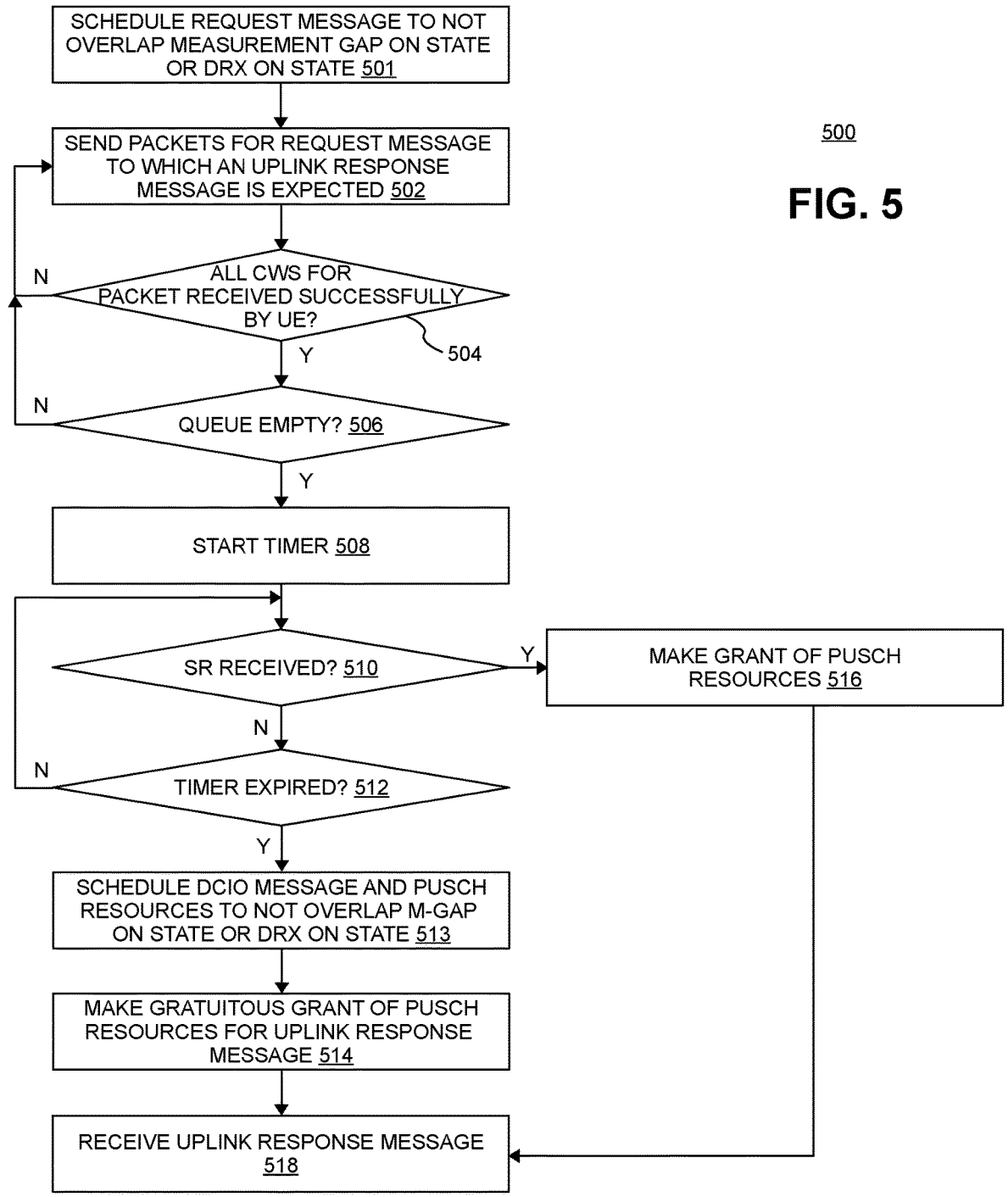

FIG. 5 comprises a flow chart illustrating one exemplary embodiment of a method of making a gratuitous grant of PUSCH resources in connection with an exchange of SRB1 or SRB2 messages during the LTE Connection and Attach procedures when a measurement gap or DRx is enabled at the UE 108.

Figure 6:
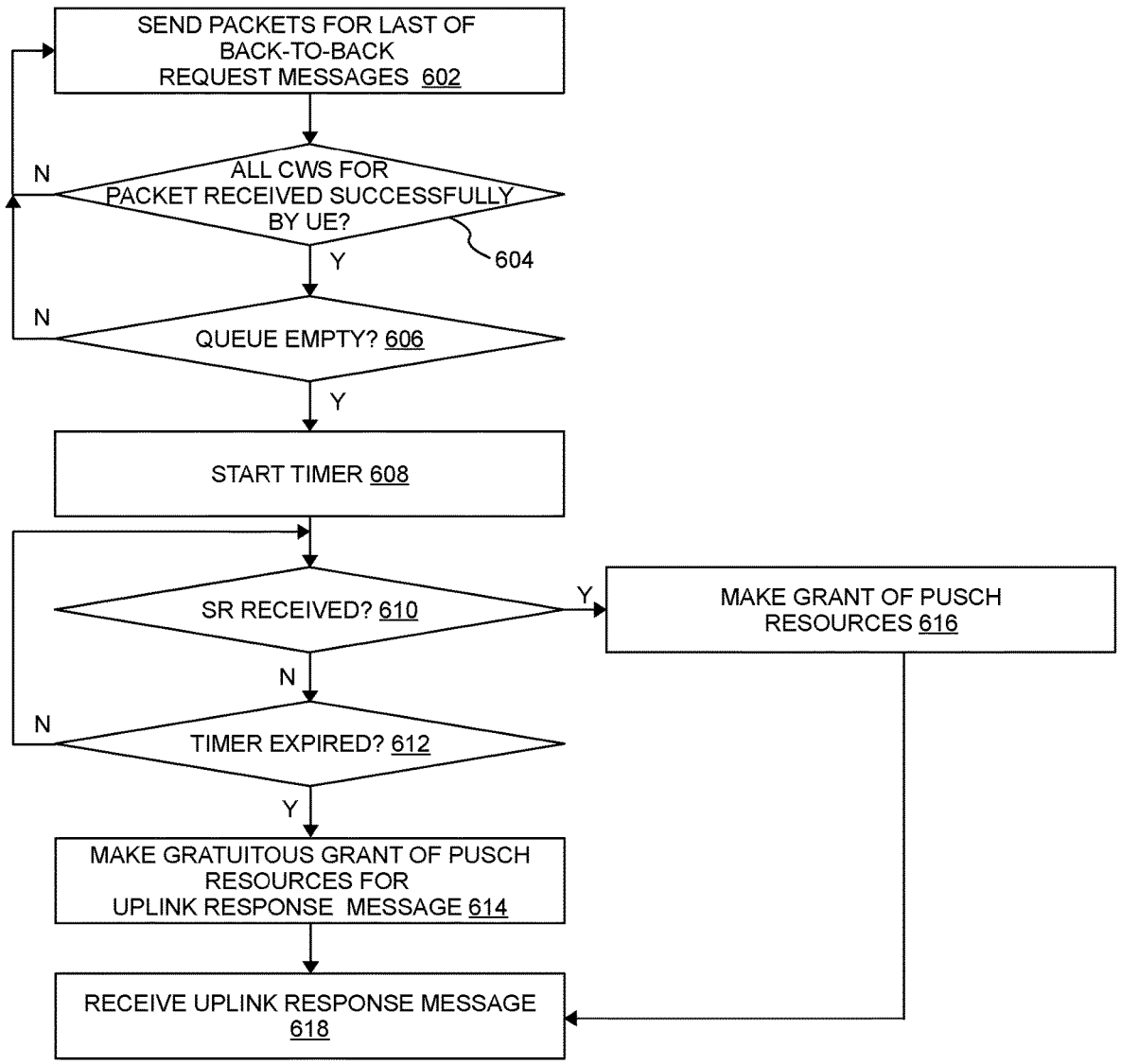

FIG. 6 comprises a flow chart illustrating one exemplary embodiment of a method of making a gratuitous grant of PUSCH resources when back-to-back downlink messages are transmitted during the LTE Connection and Attach procedures.

Figure 7:
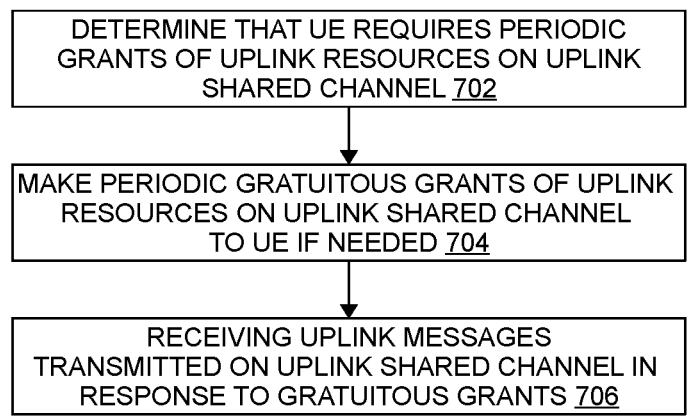

FIG. 7 comprises a flow chart illustrating one exemplary embodiment of a method of making periodic gratuitous grants of uplink shared channel resources.

Like reference numbers and designations in the various drawings indicate like elements.

DETAILED DESCRIPTION

FIG. 1 is a block diagram illustrating one exemplary embodiment of a radio access network (RAN) system 100 in which the techniques described here can be implemented.

The RAN system 100 comprises one or more base stations 102 (also referred to here as "Evolved Node Bs" or "eNodeBs"). Each eNodeB 102 serves at least one cell 104 and includes or is coupled to one or more antennas 106 via which downlink RF signals are radiated to user equipment (UE) 108 and via which uplink RF signals transmitted by UEs 108 are received.

Each eNodeB 102 is coupled to a core network 110 of a wireless network operator over an appropriate back-haul. In the exemplary embodiment shown in FIG. 1, the Internet 112 is used for back-haul between each eNodeB 102 and each core network 110. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, each eNodeB 102 implements an LTE Evolved Node B that is used to provide the user equipment 108 with mobile access to the wireless network operator's core network 110 to enable the user equipment 108 to wirelessly communicate data and voice (using, for example, Voice over LTE (VoLTE) technology).

Also, in this exemplary LTE embodiment, each core network 110 is implemented as an LTE Evolved Packet Core (EPC) 110 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Each eNodeB 102 can be implemented in various ways. For example, each eNodeB 102 can be implemented using a traditional monolithic macro base station configuration, a microcell, picocell, femtocell or other "small cell" configuration, or a centralized or cloud RAN (C-RAN) configuration. Each eNodeB 102 can be implemented in other ways.

Also, in the exemplary embodiment shown in FIG. 1, each eNodeB 102 comprises at least one radio 114 configured to wireless communicate with the UE 108 and at least one processor 116 configured to execute software or firmware 118 that causes the eNodeB 102 to perform at least some of the functions described here as being performed by the eNodeB 102. The software or firmware 118 comprises program instructions that are stored (or otherwise embodied) on or in an appropriate non-transitory storage medium or media 120 from which at least a portion of the program instructions are read by the programmable processor 116 for execution thereby. Although the storage media 120 is shown in FIG. 1 as being included in, and local to, the respective eNodeB 102, it is to be understood that remote storage media (for example, storage media that is accessible over a network) and/or removable media can also be used. Each eNodeB 102 also includes memory 122 for storing the program instructions (and any related data) during execution by the programmable processor 116.

In the example shown in FIG. 1, the software or firmware 118 implements, among other things, a Media Access Control (MAC) layer (comprising a scheduler) 124 that performs base-station-related MAC processing, a Radio Link Control (RLC) entity 126 that performs base-station-related RLC processing, and a Radio Resource Control (RRC) entity 128 that performs base-station-related RRC processing.

Each eNodeB 102 can be implemented in other ways.

FIG. 2 comprises a high-level flow chart illustrating one exemplary embodiment of a method 200 of making gratuitous grants of uplink shared channel resources. The embodiment of method 200 shown in FIG. 2 is described here as being implemented in the RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 is described here as being performed for each UE 108 when it is performing an exchange of messages that involves a request message that is sent to the UE 108 (for example, a message originating in the base station 102 or the core network 110) and a response message that is sent from the UE 108 on a shared uplink channel. The particular UE 108 for which method 200 is being performed is referred to here as the "current" UE 108.

Method 200 comprises sending a request message from the serving base station 102 to the current UE 108 (block 202). The request message is one for which an uplink response message is expected to be wirelessly transmitted by the current UE 108 on a shared uplink channel. The request message is transmitted to the current UE 108 on a downlink channel used for wirelessly communicating with the current UE 108. As noted above, the request message can originate from the base station 102 or from elsewhere (for example, from the core network 110).

Method 200 further comprises making a gratuitous grant of uplink resources to the current UE 108 (block 204). This grant of uplink resources is "gratuitous" in that the base station 102 makes this grant without the current UE 108 making, and without the base station 102 receiving, a scheduling request for the uplink resources.

The base station 102 is configured to make the gratuitous grant so that the current UE 108 will be able to wirelessly transmit the expected response message on the shared uplink channel very close to the time that the current UE 108 is ready to transmit the response message. The base station 102 is configured to do this by having the base station 102 make the gratuitous grant in a timely manner and by scheduling appropriate uplink resources for the current UE 108 to transmit the respective response message in a timely manner.

In some implementations of this embodiment, the base station 102 can be configured to wait an amount of time that is sufficient for the current UE 108 to react to the request message and be ready to send a response message on the uplink channel. Then, after this amount of time has passed, the base station 102 makes the gratuitous grant of uplink resources.

In some implementations, the current UE 108 provides feedback (for example, HARQ feedback) to the base station 102 indicating that the current UE 108 successfully received the request message. In such implementations, the base station 102 can be configured to determine the amount of time that is sufficient for the current UE 108 to react to the request message and be ready to send a response message on the uplink channel as a function of when the base station 102 has successfully received positive feedback for the request message. For example, the base station 102 can be configured to wait to start an associated timer until positive feedback is successfully received by the base station 102.

Other embodiments can be implemented in other ways.

Method 200 further comprises receiving, by the base station 102, an actual uplink response message transmitted by the current UE 108 on the uplink shared channel in response to the gratuitous grant (block 206).

In response to receiving the downlink request message, the current UE 108 will process the received downlink request message (for example, performing an action specified in the request message or obtaining information requested in the request message) and, if appropriate, prepare a response message for transmission on the uplink channel. Then, the current UE 108 wirelessly transmits the response message on the shared uplink channel using the resources specified in the gratuitous grant (for example, using the PRBs and MCS specified in the gratuitous grant).

As noted above, the base station 102 is configured to make the gratuitous grant so that the current UE 108 will be able to wirelessly transmit the expected response message on the shared uplink channel very close to the time that the current UE 108 is ready to transmit the response message. Because of this, uplink latency can be reduced. This is because the overhead associated with requesting and being granted shared uplink channel resources can be avoided.

Embodiments of method 200 can be used in other situations. In general, during the lifetime of a RRC connection for a UE, if a given downlink signaling message that is to be sent to that UE is a request to which the UE will send a response message (for example, involving the setup or tear-down of a bearer using a RRC Connection Reconfiguration procedure), the base station can make gratuitous grants of uplink resources on the uplink shared channel to that UE for the response message. Also, if certain UEs require periodic grants of uplink resources on the uplink shared channel, the base station can make gratuitous grants of uplink resources on the uplink shared channel to those UEs for the periodic messages.

Also, embodiments of method 200 can be used with the Connection and Attach procedures described above.

As noted above, a UE 108 establishes an RRC connection with the serving eNodeB 102 using the LTE Connection and Attach procedures. Each of the LTE Connection and Attach procedures comprises an exchange of messages that involves a request message that is sent to the UE 108 and a response message that is sent from the UE 108 on the PUSCH. For example, the request message can be a message originating at an RRC entity 128 in the eNodeB 102 or a Non-Access Stratum (NAS) 130 entity in the EPC 110).

In one example, such an exchange of messages is done for DL-CCCH messages transmitted in connection with the Connection and Attach procedures. The LTE specifications specify that a UE 108 must transmit a response message for some DL-CCCH messages transmitted in connection with the Connection and Attach procedures. The LTE specifications also specify that a UE does not transmit a response message for other DL-CCCH messages transmitted in connection with the Connection and Attach procedures.

For example, when a UE 108 is establishing or re-establishing an RRC connection, the UE 108 will use the RACH procedure and send the serving eNodeB 102 a MSG3 containing a RRC Connection Request or a RRC Connection Re-Establishment Request, as the case may be. After the RACH procedure is completed at the MAC layer 124 of the serving eNodeB 102, the MAC layer 124 forwards the MSG3 received from the UE 108 to the RRC entity 128 in the eNodeB.

If the MSG3 includes a RRC Connection Request, the RRC entity 128 will consult the RRM entity 132 and do an admission-check for the UE 108. The RRM entity 132 will provide configuration parameters for the UE 108 (for example, configuration parameters for SR, Sounding Reference Signal (SRS), Channel Quality Indicator (CQI), and SRB1 RLC Configuration)). The RRC entity 132 will prepare an RRC Connection Setup message with the configuration parameters and forward it to the MAC layer 124 for transmission to the UE 108 on the DL-CCCH. After the UE 108 successfully receives the RRC Connection Setup message, the UE 108 will apply the configuration parameters, and then respond with a RRC Connection Setup Complete message, which is transmitted on the PUSCH.

If RRM entity 132 does not admit the UE 108, the RRC entity 128 will cause a RRC Connection Reject message to be sent to the UE 108 on the DL-CCCH. The RRC Connection Reject message does not require a response from the UE 108.

If the MSG3 includes a RRC Connection Re-Establishment Request, the RRC entity 128 will try to fetch a context for the UE 108. If a valid context for the UE 108 is found and there is a MAC-I match, the RRC entity 128 will generate a RRC Connection Re-Establishment message and forward it to the MAC layer 124 for transmission to the UE 108 on the DL-CCCH. After the UE 108 successfully receives the RRC Connection Re-Establishment message, the UE 108 will respond with a RRC Connection Re-Establishment Complete message, which is transmitted on the PUSCH.

If a valid context for the UE 108 cannot be fetched or there is not a MAC-I match, the RRC entity 128 will cause a RRC Re-Establishment Reject message to be sent to the UE 108 on the DL-CCCH. The RRC Re-Establishment Reject message does not require a response from the UE 108.

FIG. 3 comprises a flow chart illustrating one exemplary embodiment of a method 300 of making a gratuitous grant of PUSCH resources in connection with a Downlink Common Control Channel (DL-CCCH) message transmitted in connection with the LTE Connection and Attach procedures. The embodiment of method 300 shown in FIG. 3 is described here as being implemented in the RAN system 100 of FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described here for ease of explanation; however, it is to be understood that method 300 can and typically would include such exception handling.

Method 300 is described here as being performed after a UE 108 has used the RACH procedure to establish or re-establish a RRC connection and the MSG3 contains either a RRC Connection Request or a RRC Connection Re-Establishment Request and the serving eNodeB 102 is ready to send a DL-CCCH message to the UE 108 that the UE 108 is expected to send a response message on the PUSCH (that is, a RRC Connection Setup message or a RRC Connection Re-Establishment message but not a RRC Connection Reject message or a RRC Re-Establishment Reject message). The particular UE 108 for which method 300 is being performed is referred to here as the "current" UE 108.

Method 300 comprises sending, from the eNodeB 102 to the UE 108 on the DL-CCCH, a DL-CCCH message to which the current UE 108 is expected to transmit a response message on the PUSCH (block 302). In this example, the DL-CCCH message can be a RRC Connection Setup message or a RRC Connection Re-Establishment message.

In this exemplary embodiment, each DL-CCCH message can be transmitted using a DL Transport Block (DL TB). Also, in this exemplary embodiment, the current UE 108 will provide HARQ feedback to the serving eNodeB 102 for each DL TB used for transmitting a DL-CCCH message that indicates whether the current UE 108 successfully received that DL TB.

When the eNodeB 102 is provided with HARQ feedback indicating that such a DL-CCCH message was successfully received by the current UE 108 (that is, if the HARQ feedback an "ACK") (checked in block 304), the serving eNodeB 102 checks if the DL-CCCH queue for the current UE 108 is empty (block 306). The DL-CCCH queue for the current UE 108 will be empty when the entire DL-CCCH message has been transmitted and successfully received by the current UE 108.

If the HARQ feedback does not indicate that the DL-CCCH message was successfully received by the current UE 108 (that is, is a "DTX" or "NACK"), method 300 loops back to block 302.

If the HARQ feedback indicates that the DL-CCCH message was successfully received by the current UE 108 but the DL-CCCH queue for the current UE 108 is not empty, that means the entire DL-CCCH message has been not transmitted and successfully received by the current UE 108, in which case method 300 loops back to block 302.

If the HARQ feedback indicates that the DL-CCCH message was successfully received by the current UE 108 and the DL-CCCH queue for the current UE 108 is empty, the eNodeB 102 starts a timer (block 308). The timer is initialized with an amount of time that is sufficient for the current UE 108 to apply the configuration included in the DL-CCCH message and be ready to send an expected response message to the eNodeB 102. This amount of time can be determined, for example, based on Section 11 of 3GPP Specification No. 36.311 for LTE.

If the timer expires without having received a SR from the current UE 108 (checked in blocks 310 and 312), the eNodeB 102 sends the current UE 108 a gratuitous grant of PUSCH resources (block 314). If the size of the expected response message is known to the eNodeB 102, the gratuitous grant can include sufficient PUSCH resources for the current UE 108 to send an expected response message. If the size of the expected response message is not known to the eNodeB 102, the gratuitous grant can include a default amount of PUSCH resources.

As noted above, this grant is gratuitous in the sense that it is sent without waiting for (and is not in response to) a corresponding SR from the UE. Sending a gratuitous grant, even if the size of the expected response message is not known, is still beneficial since the uplink latency caused by waiting for a SR from the current UE is avoided.

The expected response message is the message that would be expected to be transmitted by the current UE 108 to the eNodeB 102 in response to receiving the DL-CCCH and processing it appropriately. For example, where the DL-CCCH message is a a RRC Connection Setup Request message, the expected response message would be a RRC Connection Setup Complete message. Where the DL-CCCH message is a RRC Connection Re-Establishment Request, the expected response message would be a RRC Connection Re-Establishment Complete message As noted above, this grant of PUSCH resources is "gratuitous" in that the eNodeB 102 makes this grant of PUSCH resources without waiting to receive a corresponding SR from the current UE 108. In other words, after the timer expires without having received a corresponding SR, the eNodeB 102 acts as if it has received a corresponding SR from the current UE 108 for the expected response message and it makes a grant of PUSCH resources for the current UE 108.

The PUSCH grant comprises the following main parameters—start PRB Index, number of PRBs, and MCS value. The current UE will encode the uplink packet using the given MCS and transmit it on the provided uplink PRBs. In this LTE example, the eNodeB 102 signals this gratuitous grant by transmitting an appropriate DCI0 message on the PDCCH to the current UE 108.

Preferably, the eNodeB 102 sends the gratuitous grant of PUSCH resources at the first opportunity to do so that occurs after the expiration of the timer.

If a SR is received from the current UE 108 before the timer expires, the eNodeB 102 sends the current UE 108 a grant of PUSCH resources in response to that SR (block 316). This can be done in the standard way.

Method 300 further comprises receiving, by the eNodeB 102, an actual uplink response message transmitted by the current UE 108 on the PUSCH in response to the grant (block 318). This is done whether the grant is a gratuitous grant or a grant made in response to a SR received from the current UE 108.

In response to receiving the downlink request message, the current UE 108 will process the received downlink request message (for example, performing an action specified in the request message or obtaining information requested in the request message) and, if appropriate, prepare a response message for transmission on the PUSCH.

Also, the current UE 108 continuously monitors PDCCH channel and will receive the gratuitous grant of PUSCH resources. The current UE 108 can then wirelessly send the response message (if one has been prepared) to the eNodeB 102 on the PUSCH in accordance with the gratuitous grant (for example, using the PRBs and MCS specified in the gratuitous grant). In general, the eNodeB 102 and current UE 108 act as if the current UE 108 had sent a SR for the response message.

Because the current UE 108 receives the gratuitous grant of PUSCH resources very close to the time that the current UE 108 is ready to transmit the response message, the uplink latency can be reduced. This is because the overhead associated with requesting and being granted PUSCH resources can be avoided.

Embodiments of method 200 shown in FIG. 2 can also be used with the exchanges of SRB1 or SRB2 messages that occur during the LTE Connection and Attach procedures.

The exchange of SRB1 or SRB2 messages is worthy of special note because these messages are typically sent using RLC AM Mode.

FIG. 4 comprises a flow chart illustrating one exemplary embodiment of a method 400 of making a gratuitous grant of PUSCH resources in connection with an exchange of SRB1 or SRB2 messages during the LTE Connection and Attach procedures. The embodiment of method 400 shown in FIG. 4 is described here as being implemented in the RAN system 100 of FIG. 1, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described here for ease of explanation; however, it is to be understood that method 400 can and typically would include such exception handling.

Method 400 is described here as being performed during the Connection and Attach procedures in the following situation. In this situation, the UE 108 has established or re-established an RRC connection, and the serving eNodeB 102 is ready to send a message on the SRB1 or SRB2. Also, in this situation, the particular message sent by the serving eNodeB 102 is one that the serving eNodeB 102 expects the UE 108 to transmit response to on the PUSCH. The particular UE 108 for which method 400 is being performed is referred to here as the "current" UE 108.

In this exemplary embodiment, the RRC Connection Setup message can configure the current UE 108 to use transmission mode (TM) 3 or 4 for downlink transmissions. When this is done, the eNodeB 102 can thereafter transmit to the current UE 108 using two code words (CWs). If the current UE is configured to use transmission mode 2, one code word is used for transmitting to the current UE.

Also, in this example, the SRB1 or SRB2 is configured to use RLC AM Mode during this part of the Connection and Attach procedures This means all such SRB1 or SRB2 messages must follow RLC AM Mode transmission rules (for example, regarding RLC sequence numbering, poll timing, RLC status reporting, RLC retransmission, etc.). The SRB1 or SRB2 message can be transmitted as a single unit (in a single SRB1 or SRB2 packet) or can be segmented into multiple RLC segments (in multiple SRB1 or SRB2 packets).

Method 400 comprises sending, from the eNodeB 102 to the current UE 108, one or more downlink packets for a downlink message to which the current UE 108 is expected to transmit a response message using the PUSCH (block 402). In this embodiment, the downlink message is a SRB1 or SRB2 message that is transmitted by the eNodeB 102 as a part of the Connection and Attach procedures that occurs after the RRC connection has been established or re-established. This downlink message is also referred to here as the "current" downlink message.

The current UE 108 will provide HARQ feedback to the serving eNodeB 102 for each CW used to transmit the current downlink message. The HARQ feedback indicates whether the current UE 108 successfully received the respective CW.

If the HARQ feedback provided to the eNodeB 102 for all of the CWs for a given packet indicates that all of the CWs were successfully received by the current UE 108 (that is, an "ACK") (checked in block 404), the serving eNodeB 102 checks if the relevant queue for the current UE 108 is empty (block 406). In this embodiment, the relevant queue for the current UE 108 is the SRB1 queue if the message being transmitted is a SRB1 message and is the SRB2 queue if the message being transmitted is a SRB2 message. The relevant queue for the current UE 108 will be empty when the entire current downlink message has been transmitted and successfully received by the current UE 108. That is, the relevant queue for the current UE 108 will be empty when all of the packets used to transmit the entire current downlink message have been transmitted and successfully received by the current UE 108.

If any of the HARQ feedback indicates that any CW was not successfully received by the current UE 108 (that is, is a "DTX" or a "NACK"), the corresponding packet will be retransmitted as a part of the HARQ process and method 400 loops back to block 402.

If the HARQ feedback for all of the CWs for a given packet indicates that all of the CWs were successfully received by the current UE 108 but the relevant queue for the current UE 108 is not empty, that means that all of the packets for the entire current downlink message have been not transmitted and successfully received by the current UE 108. In this case, method 400 loops back to block 402 to transmit the rest of the packets for the current downlink message.

If the HARQ feedback for all of the CWs for a given packet indicates that all of the CWs were successfully received by the current UE 108 and the relevant queue for the current UE 108 is empty, that means all of the packets for the entire current downlink message have been transmitted and successfully received by the current UE 108. When this is the case, the eNodeB 102 starts a timer (block 408). The timer is initialized with an amount of time that is sufficient for the current UE 108 to process the current downlink message and be ready to send the response message to the eNodeB 102. This amount of time can be determined, for example, based on Section 11 of 3GPP Specification No. 36.331 for LTE).

If the timer expires without having received a SR from the current UE 108 (checked in blocks 410 and 412), the eNodeB 102 sends the current UE 108 a gratuitous grant of PUSCH (block 414). The expected response message is the SRB1 or the SRB2 message, as the case may be, that would be expected to be transmitted by the current UE 108 to the eNodeB 102 in response to receiving the SRB1 or SRB2 message and processing it appropriately.

If the size of the expected response message is known to the eNodeB 102, the gratuitous grant can include sufficient PUSCH resources for the current UE 108 to send the expected response message. If the size of the expected response message is not known to the eNodeB 102, the gratuitous grant can include a default amount of PUSCH resources.

As noted above, this grant is gratuitous in the sense that it is sent without waiting for (and is not in response to) a corresponding SR from the UE. Sending a gratuitous grant, even if the size of the expected response message is not known, is still since the uplink latency caused by waiting for a SR from the current UE is avoided.

The PUSCH grant comprises the following main parameters—start PRB Index, number of PRBs, and MCS value. The current UE will encode the uplink packet using the given MCS and transmit it on the provided uplink PRBs. In this LTE example, the eNodeB 102 signals this gratuitous grant by transmitting an appropriate DCI0 message on the PDCCH to the current UE 108. In this example, since SRB1 or SRB2 is an RLC AM mode logical channel (LCH), the uplink transport block size in the gratuitous grant should account for the RLC Control packet along with the uplink response message.

Preferably, the eNodeB 102 sends the gratuitous grant of PUSCH resources at the first opportunity to do so that occurs after the expiration of the timer.

If a SR is received from the current UE 108 before the timer expires, the eNodeB 102 sends the current UE 108 a grant of PUSCH resources in response to the SR (block 416). This can be done in the standard way.

Method 400 further comprises receiving, by the eNodeB 102, an actual uplink response message transmitted by the current UE 108 on the PUSCH in response to the grant (block 418). This is done whether the grant is a gratuitous grant or a grant made in response to a SR received from the current UE 108.

In response to receiving the current downlink request message, the current UE 108 will process the received downlink request message (for example, performing an action specified in the request message or obtaining information requested in the request message) and, if appropriate, prepare a response message for transmission on the PUSCH.

Also, the current UE 108 continuously monitors PDCCH channel and will receive the gratuitous grant of PUSCH resources. The current UE 108 can then wirelessly send the response message (if one has been prepared) to the eNodeB 102 on the PUSCH in accordance with the gratuitous grant (for example, using the PRBs and MCS specified in the gratuitous grant). In general, the eNodeB 102 and current UE 108 act as if the current UE 108 had sent a SR for the response message.

Because the current UE 108 receives the gratuitous grant of PUSCH resources very close to the time that the current UE 108 is ready to transmit the response message, the uplink latency can be reduced. This is because the overhead associated with requesting and being granted PUSCH resources can be avoided.

It may be possible that the current UE 108 is suffering a heavy BLER in uplink direction alone. As a result, the PUSCH transmissions sent by the current UE 108 using the gratuitous grant may be lost. However, as noted above, in this example, SRB1 or SRB2 is used in RLC AM Mode LCH. So, the RLC Poll Retransmission Timer procedure will cause the original current downlink message to be retransmitted if the expected response message from the current UE 108 (including an RLC Status Report for the downlink SRB1 message) is not received by the eNodeB 102 in the time period required for such RLC AM Mode transmissions. In this example, all downlink packets would qualify for having their Poll Bit being set because every packet would be the last packet in the queue at any point in time.

When the retransmission of the current downlink message is triggered because the RLC Poll Transmission timer expires without having received the expected response message from the current UE 108, the retransmission of the current downlink message would also be monitored, and a gratuitous grant is provided for it, using method 400. In this situation, the relevant "current downlink message" would be the RLC retransmitted downlink message.

Embodiments of method 400 can be used for any procedure that involves an eNodeB 102 sending a downlink SRB1 or SRB2 message to which the UE 108 is expected to send an uplink SRB1 or SRB2 response message.

A downlink RRC Connection Reconfiguration message can be sent to a UE 108 to enable a measurement gap or Discontinuous Reception (DRx) at the UE 108. If either of these things are done, the responsive uplink RRC Connection Reconfiguration Complete message sent by the UE 108 itself must be scheduled by the serving eNodeB 102 such that it does not overlap with measurement gap "ON" state or the DRx "ON" state of the UE. This needs to be reflected in the gratuitous grant of uplink PUSCH resources that is made for the UE 108 to send the uplink RRC Connection Reconfiguration Complete message in response to the downlink RRC Connection Reconfiguration message. The method 400 shown in FIG. 4 can be modified to support situations where a measurement gap or DRx is enabled at the UE 108. Such an embodiment is shown in FIG. 5.

FIG. 5 comprises a flow chart illustrating one exemplary embodiment of a method 500 of making a gratuitous grant of PUSCH resources in connection with an exchange of SRB1 or SRB2 messages during the LTE Connection and Attach procedures when a measurement gap or DRx is enabled at the UE 108. The embodiment of method 500 shown in FIG. 5 is described here as being implemented in the RAN system 100 of FIG. 1, though it is to be understood that other embodiments can be implemented in other ways.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described here for ease of explanation; however, it is to be understood that method 500 can and typically would include such exception handling.

In general, method 500 proceeds as described above in connection with FIG. 4 except as described below. Moreover, features shown in FIG. 5 using reference numerals that have the same last two digits as features shown in FIG. 4 are, except as described below, substantially the same and the associated description of such features set forth above in connection with FIG. 4 applies to the respective features shown in FIG. 5, the description of which is not repeated for the sake of brevity.

When a measurement gap or DRx is enabled at the current UE 108, the current UE 108 continuously monitors the PDCCH channel unless it has entered a measurement Gap "ON" state or has entered the DRx "ON" state.

However, a measurement gap or DRx has been enabled at the UE 108, when the eNodeB 102 is ready to send one or more downlink packets for a downlink message to which the current UE 108 is expected to transmit a response message using the PUSCH, those downlink packets (as well as any Physical Hybrid-ARQ Indicator Channel (PHICH) resources) must be scheduled by the serving eNodeB 102 such that they do not overlap with the measurement gap ON state or the DRx ON state of the current UE 108 (block 501). Otherwise, the sending of the downlink packets proceeds above as described above in connection with block 402 of FIG. 4.

Also, after a measurement gap or DRx has been enabled at the UE 108, when the eNodeB 102 is ready to send the current UE 108 a gratuitous grant of PUSCH resources to the eNodeB 102, the DCI0 message and PUSCH resources (as well as any PHICH resources) must be scheduled by the serving eNodeB 102 such that they do not overlap with the measurement gap ON state or the DRx ON state of the current UE 108 (block 513). Otherwise, the sending of the gratuitous grant proceeds as described above in connection with block 414 of FIG. 4.

In this way, the advantages of method 400 can be achieved when a measurement gap or DRx is enabled at the UE 108.

In one example, method 500 is used for a RRC Connection Reconfiguration message that causes the current UE 108 to that enables a measurement gap or DRx at the UE 108. When the eNodeB 102 is ready to send such RRC Connection Reconfiguration message to the current UE 108, a measurement gap or DRx will not yet have been enabled at the current UE 108 at the time the downlink RRC Connection Reconfiguration message is scheduled for transmission to the current UE 108. Therefore, the scheduler does not need to take into account the measurement gap or DRx states of the current UE 108 when this message is scheduled for transmission.

However, after the RRC Connection Reconfiguration message is received by the current UE 108, a measurement gap or DRx will have been enabled at the current UE 108. If a measurement gap has been enabled at the current UE 108, then the corresponding DCI0 message and PUSCH resources (as well as any PHICH resources) for the uplink response message to the RRC Connection Reconfiguration message must be scheduled by the serving eNodeB 102 such that they do not overlap with the measurement gap ON state of the current UE 108. In this example, the uplink response message is the RRC Connection Reconfiguration Complete message. It is noted that, in this example, even if the RRC Connection Reconfiguration message causes the current UE 108 to enable DRx at the current UE 108, the current UE 108 will not enter the DRx ON state until after the RRC Connection Reconfiguration Complete message is transmitted.

In some cases, multiple procedures performed as a part of the Connection and Attach procedures can overlap. When this happens, multiple downlink messages to which the UE 102 is expected to send response messages on the PUSCH can be sent "back to back." Such downlink messages are sent "back to back" when a subsequent downlink message is transmitted to the UE 102 before the prior uplink response message has been received from the UE 102. When this happens, it will possible that the UE 102 has more than one uplink response message to be transmitted on the PUSCH.

The method 400 shown in FIG. 4 can be modified to support this situation. Such an embodiment is shown in FIG. 6.

FIG. 6 comprises a flow chart illustrating one exemplary embodiment of a method 600 of making a gratuitous grant of PUSCH resources when back-to-back downlink messages are transmitted during the LTE Connection and Attach procedures. The embodiment of method 600 shown in FIG. 6 is described here as being implemented in the RAN system 100 of FIG. 1, though it is to be understood that other embodiments can be implemented in other ways.

The blocks of the flow diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner). Also, most standard exception handling is not described here for ease of explanation; however, it is to be understood that method 600 can and typically would include such exception handling.

In general, method 600 proceeds as described above in connection with FIG. 4 except as described below. Moreover, features shown in FIG. 6 using reference numerals that have the same last two digits as features shown in FIG. 4 are, except as described below, substantially the same and the associated description of such features set forth above in connection with FIG. 4 applies to the respectively features shown in FIG. 6, the description of which is not repeated for the sake of brevity. Also, the enhancements to method 400 described here in connection with method 600 and FIG. 6 can also be combined with the enhancements to method 400 described above in connection with method 500 and FIG. 5.

When the eNodeB 102 sends back-to-back downlink messages, the current UE 108 will process the downlink messages in the order the downlink messages are received. As a result, the uplink response messages will become ready for transmission on the PUSCH in the same order the corresponding downlink message is received.

In this embodiment, the eNodeB 102 schedules the gratuitous grant of PUSCH resources based on the last of the back-to-back downlink messages that are sent. That is, the current downlink message that is the subject of FIG. 6 and the associated description is the last of the back-to-back downlink messages.

The current UE 108 can use a SR to have the eNodeB 102 grant the current UE 108 PUSCH resources for transmitting uplink response messages to earlier downlink messages as they become available for transmission on the PUSCH.

The eNodeB 102 may not successfully receive such a SR before the eNodeB 102 makes the gratuitous grant of PUSCH resources. For example, the current UE 108 may not be able to make a SR before the gratuitous grant is made. Also, the eNodeB 102 may not successfully receive a SR that was made by the current UE 108. If the eNodeB 102 does not successfully receive such a SR before the eNodeB 102 makes the gratuitous grant of PUSCH resources, the current UE 108 will still receive the gratuitous grant of PUSCH resources that the eNodeB 102 sent based on the last of the back-to-back downlink messages. Thus, when the current UE 108 is transmitting an uplink message in response to the gratuitous grant, the current UE 108 can include a BSR that accounts for all of the uplink response messages that have not yet been transmitted on the PUSCH. The BSR will cause the eNodeB 102 to schedule subsequent uplink grants until the BSR becomes zero. As a result, all the uplink response messages can be transmitted on the PUSCH without the current UE 108 making another SR (and without the associated uplink latency).

The eNodeB 102 can be configured in many ways to use gratuitous grants described above.

For example, the MAC layer in the eNodeB 102 is not aware of the contents of the downlink message for which an uplink response message is expected to be sent on the PUSCH. Also, the MAC layer is not aware of the UE's state machine in the RRC layer. So, the MAC layer in the eNodeB 102 is not able to estimate a possible size of the uplink response message. In the absence of this information, the MAC layer in the eNodeB 102 can be configured to provide a configurable default nominal grant of PUSCH resources. Some uplink response messages are very small (for example, RRC Connection Reconfiguration Complete). However, some uplink response messages are larger and may be segmented.

To address this, in some embodiments, the RRC and MAC layers of the eNodeB 102 are configured to do the following. The RRC layer determines the expected size of the uplink response message for a given downlink message. The RRC layer to signals the expected size of the uplink response message to the MAC layer when the RRC layer communicates with the MAC layer in connection with transmitting the downlink message. The MAC layer can then appropriately schedule, from a size perspective, uplink resources for the UE 108 to transmit an uplink response message for the associated downlink message. The MAC layer does this by providing sufficient PUSCH resources in the gratuitous grant for the expected size and takes into account the UE's current PHR and MCS.

The signaling of the expected size of the uplink response message can also be used as the mechanism for the RRC layer to signal to the MAC layer whether or not to make a gratuitous grant of uplink resources for a given downlink message. For example, the RRC layer and MAC layer can be configured so that the RRC layer will use a predetermined expected size (for example, a size of zero) to signal to the MAC layer that no gratuitous grant of uplink resource should be made. When the RRC layer communicates with the MAC layer in connection with transmitting a downlink message for which no uplink response message will be transmitted by the UE 108, the RRC layer provides the special expected size to the MAC layer. This signals the MAC layer to not make a gratuitous grant for that downlink message. Examples of downlink messages for which no uplink response message will be transmitted by the UE 108 include RRC Connection Release messages and RRC Connection Configuration for handover messages. A UE 108 that receives either of these downlink messages will cause the UE 108 to take the associated action (go into the IDLE state or move the target cell, respectively) immediately without sending HARQ or RLC feedback or an uplink response message.

Also, in some embodiments, the RRC and MAC layers of the eNodeB 102 are configured to signal to the MAC layer information that can be used by the MAC layer to appropriately schedule, from a timing perspective, uplink resources for the UE 108 to transmit an uplink response message for the associated downlink message. This information can include information indicating when the associated timer expired and/or when the UE 108 will be ready to transmit the associated uplink response message (determined, for example, based on the type of downlink message and estimated state of the UE 108).

Other embodiments can be implemented in other ways.

In one example, as noted above in connection with FIG. 4, gratuitous grants can be used with exchanges of messages on the SRB2, as well as the SRB0 or SRB1. The gratuitous grants of uplink resources can also be extended to data radio bearers (DRBs) and a-periodic Channel Quality Indication (CQI) reports from a UE 108.

In some embodiments, gratuitous grants can be relied on in place of SRs when the eNodeB 102 is overloaded with demand for SR resources, thereby freeing up the SR resources for situations where the use of gratuitous grants is not suitable.

Also, in some embodiments, when the PDCCH is not a constraint, gratuitous grants can be used to implement a type of semi-persistent scheduling for the uplink resources without the overhead associated with semi-persistent scheduling. Example of such overhead include overhead associated with Semi-Persistent-Scheduling Radio Network Temporary Identifier (SPS-RNTI), implicit release management, etc.

Also, the use of gratuitous grants can provide greater flexibility in configuring PHR and BSR periodicities for the UE 108.

Yet other embodiments can be implemented in other ways.

For example, as noted above, if certain UEs require periodic grants of uplink resources on the uplink shared channel, the base station can make gratuitous grants of uplink resources on the uplink shared channel to those UEs for the periodic messages.

FIG. 7 comprises a flow chart illustrating one exemplary embodiment of a method 700 of making periodic gratuitous grants of uplink shared channel resources. The embodiment of method 700 shown in FIG. 7 is described here as being implemented in the RAN system 100 of FIG. 1, though it is to be understood that other embodiments can be implemented in other ways.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner). Also, most standard exception handling is not described here for ease of explanation; however, it is to be understood that method 700 can and typically would include such exception handling.

Method 700 comprises determining that a UE 108 requires periodic grants of uplink resources on the uplink shared channel (block 702). This is typically done by the serving base station 102. This can be done, for example, by the serving base station 102 determining that a UE 108 is involved in a message exchange that, due to its nature, will involve periodic grants of uplink resources. Also, this can be done by the serving base station 102 detecting a pattern of periodic grants of uplink resources on the uplink shared channel.

Method 700 further comprises making periodic gratuitous grants of uplink resources to the UE 108 if needed (block 704) and receiving, by the base station 102, uplink messages periodically transmitted by the UE 108 on the uplink shared channel (block 706). Each such periodic gratuitous grant is made if a scheduling request is not received from the UE 108 within a given period of time. If a scheduling request is received within a given period of time, then a gratuitous grant is not needed and is not made. Instead, in that situation, the serving base station 102 will have an opportunity make a grant of uplink resource to the UE 108 for the current period in the "normal" manner.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a method performed by a base station in connection with communicating with user equipment (UE), the method comprising: sending a request message from the base station to the UE on a downlink channel; making, by the base station, a gratuitous grant, to the UE, of resources on the uplink channel for the UE to transmit a response message on the uplink channel, wherein the response message is responsive to the request message and wherein the gratuitous grant is made without waiting for a request from the UE for a grant of resources on the uplink channel for the UE to transmit the response message on the uplink channel; and receiving, by the base station, the response message transmitted by the UE on the uplink channel in response to the gratuitous grant.

Example 2 includes the method of Example 1, wherein the request message comprises a downlink Long-Term Evolution (LTE) message that comprises a request to which the UE is expected to send an uplink LTE message that includes a response to the request.

Example 3 includes the method of any of the Examples 1-2, wherein the request message comprises a set of request packets; wherein making, by the base station, the gratuitous grant, to the UE, of the resources on the uplink channel for the UE to transmit the response message on the uplink channel comprises: determining when the base station is provided with feedback indicating that each request packet was successfully received by the UE; when the base station is provided with feedback indicating that each request packet was successfully received by the UE, determining if a queue for the UE is empty; and when the queue for the UE is empty, starting a timer; and wherein the gratuitous grant is made after the timer has expired without having a received a scheduling request from the UE.

Example 4 includes the method of Example 3, wherein the timer is initialized with an amount of time sufficient for the UE to be ready to send the response message.

Example 5 includes the method of any of the Examples 3-4, wherein each request packet comprises a set of code words; wherein determining when the base station is provided with feedback indicating that each request packet was successfully received by the UE comprises: determining when the base station is provided with feedback indicating that all of the code words of each request packet was successfully received by the UE.

Example 6 includes the method of Example 5, wherein the base station is provided with hybrid automatic repeat request (HARQ) feedback indicating whether each code word of each request packet was successfully received by the UE.

Example 7 includes the method of any of the Examples 3-6, wherein the base station is provided with hybrid automatic repeat request (HARQ) feedback indicating whether each request packet was successfully received by the UE.

Example 8 includes the method of any of the Examples 3-7, wherein the request message is retransmitted if a retransmission timer expires without the response message having been received by the base station.

Example 9 includes the method of any of the Examples 1-8, wherein making, by the base station, the gratuitous grant, to the UE, of the resources on the uplink channel for the UE to transmit the response message on the uplink channel comprises: sending a LTE DCI0 message to the UE.

Example 10 includes the method of any of the Examples 1-9, wherein making, by the base station, the gratuitous grant, to the UE, of the resources on the uplink channel for the UE to transmit the response message on the uplink channel comprises: scheduling resources for at least one of the following so as to take into account any measurement gap state or discontinuous reception state of the UE: transmitting the gratuitous grant to the UE; and transmitting the response message from the UE to the base station on the uplink channel.

Example 11 includes the method of any of the Examples 1-10, where the request message comprises a last message in a series of back to back request messages sent to the UE.

Example 12 includes the method of any of the Examples 1-11, wherein the request message comprises a request message transmitted on at least one of a Long Term Evolution (LTE) Signal Radio Bearer (SRB) and an LTE Downlink Common Control Channel (DL-CCCH).

Example 13 includes a base station configured to wirelessly communicate with user equipment (UE), the base station comprising: a radio configured to wirelessly communicate with an item of user equipment (UE); at least one processor configured to cause the base station to do the following: send a request message from the base station to the UE on a downlink channel; make, by the base station, a gratuitous grant, to the UE, of resources on the uplink channel for the UE to transmit a response message on the uplink channel, wherein the response message is responsive to the request message and wherein the gratuitous grant is made without waiting for a request from the UE for a grant of resources on the uplink channel for the UE to transmit the response message on the uplink channel; and receive, by the base station, the response message transmitted by the UE on the uplink channel in response to the gratuitous grant.

Example 14 includes the base station of Example 13, wherein the request message comprises a downlink Long-Term Evolution (LTE) message that comprises a request to which the UE is expected to send an uplink LTE message that includes a response to the request.

Example 15 includes the base station of any of the Examples 13-14, wherein the request message comprises a set of request packets; wherein the at least one processor is configured to cause the base station to make, by the base station, the gratuitous grant, to the UE, of the resources on the uplink channel for the UE to transmit the response message on the uplink channel by causing the base station to do the following: determine when the base station is provided with feedback indicating that each request packet was successfully received by the UE; when the base station is provided with feedback indicating that each request packet was successfully received by the UE, determine if a queue for the UE is empty; and when the queue for the UE is empty, start a timer; and wherein the gratuitous grant is made after the timer has expired without having a received a scheduling request from the UE.

Example 16 includes the base station of Example 15, wherein the timer is initialized with an amount of time sufficient for the UE to be ready to send the response message.

Example 17 includes the base station of any of the Examples 15-16, wherein each request packet comprises a set of code words; wherein at least one processor is configured to determine when the base station is provided with feedback indicating that each request packet was successfully received by the UE by causing the base station to do the following: determine when the base station is provided with feedback indicating that all of the code words of each request packet was successfully received by the UE.

Example 18 includes the base station of Example 17, wherein the base station is provided with hybrid automatic repeat request (HARQ) feedback indicating whether each code word of each request packet was successfully received by the UE.

Example 19 includes the base station of any of the Examples 15-18, wherein the base station is provided with hybrid automatic repeat request (HARQ) feedback indicating whether each request packet was successfully received by the UE.

Example 20 includes the base station of any of the Examples 15-19, wherein the request message is retransmitted if a retransmission timer expires without the response message having been received by the base station.

Example 21 includes the base station of any of the Examples 13-20, wherein making, by the base station, the gratuitous grant, to the UE, of the resources on the uplink channel for the UE to transmit the response message on the uplink channel comprises: sending a LTE DCI0 message to the UE.

Example 22 includes the base station of any of the Examples 13-21, wherein at least one processor is configured to cause the base station to make, by the base station, the gratuitous grant, to the UE, of the resources on the uplink channel for the UE to transmit the response message on the uplink channel by causing the base station to do the following: schedule resources for at least one of the following so as to take into account any measurement gap state or discontinuous reception state of the UE: transmitting the gratuitous grant to the UE; transmitting the response message from the UE to the base station on the uplink channel.

Example 23 includes the base station of any of the Examples 13-22, where the request message comprises a last message in a series of back to back request messages sent to the UE.

Example 24 includes the base station of any of the Examples 13-23, wherein the request message comprises a request message transmitted on at least one of a Long Term Evolution (LTE) Signal Radio Bearer (SRB) and an LTE Downlink Common Control Channel (DL-CCCH).

Example 25 includes a method performed by a base station in connection with communicating with user equipment (UE), the method comprising: determining that a UE requires periodic grants of resources on the uplink channel; making, by the base station, periodic gratuitous grants, to the UE, of resources on the uplink channel for the UE if needed, wherein each gratuitous grant is made without waiting for a request from the UE for a grant of resources on the uplink channel for the UE; and receiving, by the base station, uplink messages transmitted by the UE on the uplink channel.

Example 26 includes a base station configured to wirelessly communicate with user equipment (UE), the base station comprising: a radio configured to wirelessly communicate with an item of user equipment (UE); at least one processor configured to cause the base station to do the following: determine that a UE requires periodic grants of resources on the uplink channel; make, by the base station, periodic gratuitous grants, to the UE, of resources on the uplink channel for the UE if needed, wherein each gratuitous grant is made without waiting for a request from the UE for a grant of resources on the uplink channel for the UE; and receive, by the base station, uplink messages transmitted by the UE on the uplink channel.

What is claimed is:

1. A method performed by a base station in connection with communicating with user equipment (UE) for a cell, the method comprising:
    sending a request message from the base station to the UE on a downlink channel;
    making, by the base station, a gratuitous grant, to the UE, of resources on an uplink channel for the UE to transmit a response message on the uplink channel, wherein the response message is responsive to the request message and wherein the gratuitous grant is made without waiting for a request from the UE for a grant of resources on the uplink channel for the UE to transmit the response message on the uplink channel; and
    receiving, by the base station, the response message transmitted by the UE on the uplink channel in response to the gratuitous grant; and
    wherein the gratuitous grant is made after an amount of time sufficient for the UE to be ready to send the response message has elapsed without the base station having received a scheduling request from the UE; and
    wherein the request message and the response message comprise signaling messages for the cell.

2. The method of claim 1, wherein the request message comprises a downlink Long-Term Evolution (LTE) message that comprises a request to which the UE is expected to send an uplink LTE message that includes a response to the request.

3. The method of claim 1, wherein the request message comprises a set of request packets;
    wherein making, by the base station, the gratuitous grant, to the UE, of the resources on the uplink channel for the UE to transmit the response message on the uplink channel comprises:
    determining when the base station is provided with feedback indicating that each request packet was successfully received by the UE;
    when the base station is provided with feedback indicating that each request packet was successfully received by the UE, determining if a queue for the UE is empty; and
    when the queue for the UE is empty, starting a timer; and
    wherein the gratuitous grant is made after the timer has expired without the base station having received the scheduling request from the UE.

4. The method of claim 3, wherein the timer is initialized with an amount of time sufficient for the UE to be ready to send the response message.

5. The method of claim 3, wherein each request packet comprises a set of code words;

wherein determining when the base station is provided with feedback indicating that each request packet was successfully received by the UE comprises:
determining when the base station is provided with feedback indicating that all of the code words of each request packet was successfully received by the UE.

6. The method of claim 5, wherein the base station is provided with hybrid automatic repeat request (HARQ) feedback indicating whether each code word of each request packet was successfully received by the UE.

7. The method of claim 3, wherein the base station is provided with hybrid automatic repeat request (HARQ) feedback indicating whether each request packet was successfully received by the UE.

8. The method of claim 3, wherein the request message is retransmitted if a retransmission timer expires without the response message having been received by the base station.

9. The method of claim 1, wherein making, by the base station, the gratuitous grant, to the UE, of the resources on the uplink channel for the UE to transmit the response message on the uplink channel comprises: sending a LTE DCI0 message to the UE.

10. The method of claim 1, wherein making, by the base station, the gratuitous grant, to the UE, of the resources on the uplink channel for the UE to transmit the response message on the uplink channel comprises:
scheduling resources for at least one of the following so as to take into account any measurement gap state or discontinuous reception state of the UE:
transmitting the gratuitous grant to the UE; and
transmitting the response message from the UE to the base station on the uplink channel.

11. The method of claim 1, where the request message comprises a last message in a series of back to back request messages sent to the UE.

12. The method of claim 1, wherein the request message comprises a request message transmitted on at least one of a Long Term Evolution (LTE) Signal Radio Bearer (SRB) and an LTE Downlink Common Control Channel (DL-CCCH).

13. A base station configured to wirelessly communicate with user equipment (UE) for a cell, the base station comprising:
a radio configured to wirelessly communicate with an item of user equipment (UE);
at least one processor configured to cause the base station to do the following:
send a request message from the base station to the UE on a downlink channel;
make, by the base station, a gratuitous grant, to the UE, of resources on an uplink channel for the UE to transmit a response message on the uplink channel, wherein the response message is responsive to the request message and wherein the gratuitous grant is made without waiting for a request from the UE for a grant of resources on the uplink channel for the UE to transmit the response message on the uplink channel; and
receive, by the base station, the response message transmitted by the UE on the uplink channel in response to the gratuitous grant; and
wherein the gratuitous grant is made after an amount of time sufficient for the UE to be ready to send the response message has elapsed without the base station having received a scheduling request from the UE; and
wherein the request message and the response message comprise signaling messages for the cell.

14. The base station of claim 13, wherein the request message comprises a downlink Long-Term Evolution (LTE) message that comprises a request to which the UE is expected to send an uplink LTE message that includes a response to the request.

15. The base station of claim 13, wherein the request message comprises a set of request packets;
wherein the at least one processor is configured to cause the base station to make, by the base station, the gratuitous grant, to the UE, of the resources on the uplink channel for the UE to transmit the response message on the uplink channel by causing the base station to do the following:
determine when the base station is provided with feedback indicating that each request packet was successfully received by the UE;
when the base station is provided with feedback indicating that each request packet was successfully received by the UE, determine if a queue for the UE is empty; and
when the queue for the UE is empty, start a timer; and
wherein the gratuitous grant is made after the timer has expired without the base station having received the scheduling request from the UE.

16. The base station of claim 15, wherein the timer is initialized with an amount of time sufficient for the UE to be ready to send the response message.

17. The base station of claim 15, wherein each request packet comprises a set of code words;
wherein at least one processor is configured to determine when the base station is provided with feedback indicating that each request packet was successfully received by the UE by causing the base station to do the following:
determine when the base station is provided with feedback indicating that all of the code words of each request packet was successfully received by the UE.

18. The base station of claim 17, wherein the base station is provided with hybrid automatic repeat request (HARQ) feedback indicating whether each code word of each request packet was successfully received by the UE.

19. The base station of claim 15, wherein the base station is provided with hybrid automatic repeat request (HARQ) feedback indicating whether each request packet was successfully received by the UE.

20. The base station of claim 15, wherein the request message is retransmitted if a retransmission timer expires without the response message having been received by the base station.

21. The base station of claim 13, wherein making, by the base station, the gratuitous grant, to the UE, of the resources on the uplink channel for the UE to transmit the response message on the uplink channel comprises: sending a LTE DCI0 message to the UE.

22. The base station of claim 13, wherein at least one processor is configured to cause the base station to make, by the base station, the gratuitous grant, to the UE, of the resources on the uplink channel for the UE to transmit the response message on the uplink channel by causing the base station to do the following:
schedule resources for at least one of the following so as to take into account any measurement gap state or discontinuous reception state of the UE:
transmitting the gratuitous grant to the UE;
transmitting the response message from the UE to the base station on the uplink channel.

23. The base station of claim 13, where the request message comprises a last message in a series of back to back request messages sent to the UE.

24. The base station of claim 13, wherein the request message comprises a request message transmitted on at least one of a Long Term Evolution (LTE) Signal Radio Bearer (SRB) and an LTE Downlink Common Control Channel (DL-CCCH).

25. The method of claim 1, wherein the gratuitous grant is made after the base station is provided with feedback indicating that the entire request message was successfully received by the UE.

26. The base station of claim 13, wherein the gratuitous grant is made after the base station is provided with feedback indicating that the entire request message was successfully received by the UE.

* * * * *